(12) United States Patent
Knauff (10) Patent No.: US 6,720,702 B2
(45) Date of Patent: Apr. 13, 2004

(54) ELECTRIC MACHINE WITH A ROTOR OF LOW INERTIA

(75) Inventor: Axel Knauff, Münnerstadt (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/966,343

(22) Filed: Sep. 28, 2001

(65) Prior Publication Data

US 2002/0180304 A1 Dec. 5, 2002

(30) Foreign Application Priority Data

May 30, 2001 (DE) ......................................... 101 26 340

(51) Int. Cl.[7] .............................................. H02K 1/00
(52) U.S. Cl. ...................... 310/261; 310/216; 310/217
(58) Field of Search ................................ 310/261, 216, 310/217, 218, 125, 156.01, 156.09

(56) References Cited

U.S. PATENT DOCUMENTS

| | | | | | |
|---|---|---|---|---|---|
| 4,843,270 A | * | 6/1989 | Dijken | ........................ | 310/208 |
| 5,010,267 A | * | 4/1991 | Lipo et al. | .................... | 310/162 |
| 5,525,854 A | * | 6/1996 | Hall et al. | .................... | 310/334 |
| 5,777,420 A | * | 7/1998 | Gamble et al. | ............. | 310/261 |
| 5,893,205 A | * | 4/1999 | McClelland | ................. | 29/598 |

* cited by examiner

Primary Examiner—Thanh Lam
(74) Attorney, Agent, or Firm—Henry M. Feiereisen (57) ABSTRACT

An electric machine, includes a rotor and a shaft centered interiorly of the rotor. An excitation structure is provided for generating a torque upon at least portions of the rotor. The torque from the excitation structure is picked up by a torque receiving structure on the rotor to impart the torque onto the rotor. Disposed between the torque receiving structure and a force-transfer structure for transmitting the torque from the rotor to the shaft is a web structure by which the torque is transmitted to the force transfer structure while effecting an inertial mass relief of the rotor.

38 Claims, 6 Drawing Sheets

ELECTRIC MACHINE WITH A ROTOR OF LOW INERTIA

CROSS-REFERENCES TO RELATED APPLICATIONS

This application claims the priority of German Patent Application, Serial No. 101 26 340.6, filed May 30, 2001, the subject matter of which is incorporated herein by reference.

BACKGROUND OF THE INVENTION

The present invention relates, in general, to an electric machine, and more particularly, to an electric machine of a type having a rotor, a shaft, a structure for excitation of at least parts of the rotor, a torque receiving structure upon the rotor, and a structure for realizing a force transfer between rotor and shaft.

Electric machine with rotors are known having at least one structure for excitation of at least parts of the rotor in order to impart a torque of the rotor and to thereby cause a rotation of the rotor together with the shaft. Excitation may be realized in various ways. Examples include the provision of current-carrying conductors, configured as winding, or the use of permanent magnets that effect a permanent excitation. Suitably, current-carrying conductors are placed in slots of the rotor. Forces applied upon at least one of the current-carrying conductors can, for example, be so transmitted to at least one side of the slot that torque-forming forces can act also on the entire rotor. The permanent magnets as well as the electric conductors are situated on the outer side of the rotor, whereby the permanent magnets may be attached, e.g., by gluing, to the outer surface area of the rotor. This material-based joint between the outer surface area of the rotor and the permanent magnets allows transfer of forces, in particular of torque. Typically, the rotor is also wrapped on the outside by a bandage, whereby the bandage is able to absorb centrifugal forces and holds the permanent magnets upon the outer surface area of the rotor.

An excitation structure, which is situated on the rotor, becomes part of the rotor. Suitably, the excitation structure is located on the rotor component which is preferred to conduct the magnetic flux in the rotor. This region is normally designed as annulus, i.e. flux guide ring or partial ring, and is able to receive the excitation structure. Furthermore, this ring-shaped component itself is also able to receive torques from the excitation structure and thus constitutes the torque receiving structure upon the rotor. The structure for receiving a force and/or torque upon the rotor may include a non-positive engagement, a positive engagement, or a material based joint, whereby these types of connections have the effect to make the excitation structure as part of the rotor. Positive connections include, for example, slots in the rotor for receiving the excitation structure, e.g. a winding. An example of a material-based joint includes the gluing of permanent magnets onto an outer radius of the rotor, whereby a bandage may additionally secure the permanent magnets.

Forces exerted upon the excitation structure are directed via the rotor to an interface with the shaft, so as to transfer forces to the shaft. The structure for force transfer between rotor and shaft defines this interface. Examples for a force-transfer structure include fitting keys or material-based joints, realized, for example, by welding, as well as non-positive engagement, realized, for example, through shrinkage. The force transfer and torque transfer between the torque receiving structure upon the rotor and the interface between rotor and shaft is implemented by the material of the rotor therebetween. Normally, the rotor of electric machines is made from punched laminations placed sequentially.

The conventional process for implementing a force transfer between a flux-conducting outer region of the rotor and the interface to the shaft suffers shortcomings because the force transfer is realized across solid rotor material or across rotor material formed with round bores or recesses. The moment of inertia of a body, especially of a rotating body increases, as the body mass increases, in particular of the outer regions. Thus, a solid configuration or at least mostly solid configuration of the rotor results in a significant moment of inertia of such a rotor.

It would therefore be desirable and advantageous to provide an improved electric machine to obviate prior art shortcomings and to include a rotor of low inertia.

SUMMARY OF THE INVENTION

According to one aspect of the present invention, an electric machine includes a rotor, a shaft, an excitation structure for generating a torque, a torque receiving structure for receiving the torque from the excitation structure, a structure for force transfer between the rotor and the shaft, and a web structure, disposed between the torque receiving structure and the force transfer structure, to effect an inertial mass relief of the rotor.

The present invention resolves prior art problems by realizing an inertial mass relief through provision of webs so that the moment of inertia of the rotor is reduced. The webs may have a secant-like configuration, and/or arcuate configuration and/or curved configuration. The dynamics of an electric machine can be increased by implementing a higher power output or by changing the moment of inertia of moving parts. The shaft as well as the rotor constitute moving parts of an electric machine and both rotate about the same rotation axis. As the moment of inertia of a rotary system increases with increase in distance of a mass from the rotation axis, the moment of inertial of an electric machine is reduced by decreasing the moment of inertia of the rotor because, compared to the shaft, the rotor has masses which rotate at a greater distance to the rotation axis. Although punching holes in rotor laminations of a laminated rotor had been proposed, these holes were limited to a central radius zone of the rotor, because the outer region (area of great to maximum radii) of the rotor formed a ring for conducting the magnetic flux, and the inner region (area of small to minimum radii) of the rotor formed the structure to transfer torques and forces to the shaft. Force transfer can be realized in various ways, such as, e.g., tongue and groove joints, representing a positive engagement, or non-positive engagement through shrink-on operation, or material-based joint through welding or gluing or other suitable ways.

Force transfer and/or torque transfer from the torque receiving structure upon the rotor to the structure for force transfer onto the shaft can be realized through interconnection via secant-like and/or arcuate webs. The term "secant" denotes a straight line and/or segment which intersects a curve or a circle at two points. Secant-like webs denote webs that at least partially conform to the configuration of such secants. Compared to straight lines and/or segments, secant-like webs are three-dimensional, whereby the space directions are variable. The webs may also have an arcuate configuration and assume similar or same tasks as secant-like webs. Curved secant-like webs can hereby be considered also as arcuate webs. Secant-like webs and/or arcuate webs can be so configured as to be able to transfer at least maximum torques and forces while taking into account the fatigue factor of the material associated with fabrication of the webs. When establishing a web pattern within a rotor for transfer of forces and/or torques, apart from the torque receiving structure upon the rotor and the structure for torque transfer to the shaft, and also the region of the flux pattern, all other areas of the rotor can be used for mass relief and material removal. As a consequence, substantial areas of the rotor are involved here and do not require original rotor material. The material reduction and thus the rotor mass relief decreases the moment of inertia and increases the dynamics of the electric machine.

The rotor may be made of one or more materials. Laminated rotors include mainly a plurality of rotor laminations stacked sequentially. Rotor laminations can easily be made and suitably configured in a cost-efficient manner through a punching process. Also, webs can easily be punched. Synchronous machines oftentimes utilize laminated rotors and thus can easily be designed with a rotor of low inertia with webs in accordance with the present invention.

According to another feature of the present invention, the electric machine may have at least one web or at least one partial web of secant-like configuration. Secant-like webs define a clear geometric shape of the structure of the webs or partial webs. Straight lines formed by these webs or partial webs can easily be fabricated. In the event, a rotor has, for example, rotor laminations which are punched, advantages are attained in the context of production of the punching tool. Furthermore, symmetric configurations can easily be implemented as a consequence of the secant-like webs.

Suitably, at least one web and/or partial web may have an arcuate and/or curved configuration. Arcuate and/or curved webs and/or partial webs resemble substantially a configuration of secant-like webs and/or partial webs. As there is, in fact, no difference between web and partial web, or between a curvature and an arc, it will be understood by persons skilled in the art that a description of a web is equally applicable to a partial web, and a description of a curvature is equally applicable to an arc. Curvatures are, for example, composed of arched segments. A connection between the torque receiving structure and the structure of force transfer, including torque transfer, may be realized, for example, by interconnecting one or more arcs or arched segments in tangential manner with the structure for force transfer. The ends of the arc(s) terminate, for example, at the torque receiving structure. Likewise, it is also possible to provide a tangential contact to the torque receiving structure, with the arc terminating at the structure for force transfer. A combination of different arcs and/or partial arcs does not necessarily mean that all of the arcs and/or partial arcs begin at, start at or are tangent to the torque receiving structure and/or structure for force transfer.

According to another feature of the present invention, the secant-like webs and the arched webs may be configured in a honeycomb manner.

Combination of secant-like webs and/or partial webs with arcuate sections is advantageous. For example, the force distribution at the beginning and/or end of a secant-like web and/or partial web can be improved by arcuate transitions. Arcuate transitions can reduce maximum load forces in areas in which the direction of forces changes. The direction of forces changes in particular at the beginning and/or end of a web or partial web, and at interfaces between the webs and/or partial webs. Through reduction of maximum forces, the demand on the material can be lowered and the provision of material of smaller wall thickness can be considered.

According to another feature of the present invention, the excitation structure may have at least one winding of an electric conductor. In this case, the electric machine is, preferably, configured as an asynchronous machine, a separately excited synchronous machine, or a d.c. machine. In particular, when separately excited synchronous machines and asynchronous machines are involved, the stator has a laminated core. Of course, other stator configurations are conceivable as well. The use of windings to form the excitation structure implies a positive force transfer between the excitation structure and the torque receiving structure upon the rotor. Suitably, the windings are received in slots of the rotor laminations, whereby the windings may be press-fitted or cast into the slots.

According to another feature of the present invention, the torque receiving structure may include at least one slot-like pocket for placement of at least the winding. Groove-like pockets can easily and cost-efficiently be implemented through punching operation of the laminations, when the rotor is configured by stacked laminations. The individual laminations are joined or pressed together. The integrity of the rotor laminations can be ensured, for example, by clamps or welded joints. Electric conductors in the form of windings are received in the slots.

According to another feature of the present invention, the electric machine may be configured as a permanently excited synchronous machine. Permanently excited synchronous machines are use mainly in the area of production machines and machine tools that uses also other types of machines. Depending on the application, the dynamics of the electric machine is also relevant. A high dynamic behavior of the electric machine can be realized by reducing the moment of inertia or by increasing the power output of the electric machine. Although an increase in the power output of the electric machine is able to raise the dynamics, this is also accompanied by an increase in costs for the machine. Reducing the moment of inertia of the electric machine, i.e. of the moving part(s) of the electric machine, primarily the rotor and the shaft, afford another option to improve dynamics, without encountering the increase in cost as experienced when enhancing the power output. Decrease of the moment of inertia is thus more cost-efficient.

According to another feature of the present invention, the excitation structure may be implemented by at least one permanent magnet. Suitably, the permanent magnet(s) are situated in the outer peripheral area of the rotor of an electric machine and have, depending on the magnetic field to be generated, a small mass. Also in this case, through decrease of the inertia of the rotor, the dynamics of the electric machine is enhanced. The torque receiving structure is so configured as to absorb forces and/or torques acting on the magnet(s). Moreover, the outer ring of the rotor can be so designed that the flux of the magnetic fields flows therethrough. The structure for conducting the magnetic flux and/or for the magnetic yoke may be configured as a single-piece ring or polygonal ring or as multi-part member.

According to another feature of the present invention, the torque receiving structure may have at least one contact with at least one permanent magnet. The permanent magnet(s) may, for example, be glued onto the outer side of a stator. To counteract centrifugal forces, the permanent magnets can be wrapped by bandages. In the event, the secant-like and/or arcuate webs and/or partial webs are made by an injection process, the bandage can also be injection-molded to thereby define, in fact, the outer form of the injection mold. Positioning of the permanent magnets on the rotor surface can be simplified by suitably shaping the surface, for example, through small flattening of the radius.

According to another feature of the present invention, the structure for force transfer between rotor and shaft may include at least a positive engagement and/or non-positive engagement and/or material-based joint. The structure for force transfer between rotor and shaft is located interiorly of the rotor. This interior region terminates at the shaft, whereby this region and the shaft are coupled together to transfer forces and/or torques. A transfer of forces and/or torques may be implemented, for example, though positive connections such as fitting key assemblies. The rotor with the shaft may include one or more fitting key assemblies, which may be configured such that, for example, the shaft as well as the rotor may have a groove for receiving a key. Non-positive engagements may be implemented, for example, through shrinkage of the rotor onto the shaft. Material-based joints may include, for example, welded or glued connections as well as a fabrication of shaft and rotor from a material block. Form and/or shape and/or configuration of the structure for force transfer between rotor and shaft can be best suited to requirements at hand. For example, this structure may be designed as polygonal ring which can be connected to the shaft, for example, by a tongue and groove joint, or through positive engagement, or through non-positive engagement, whereby webs are connected in the area of the polygonal ring. The structure for force transfer may also be designed as ring or any other suitable geometric configuration, e.g. polygon. Webs of secant-like configuration or arcuate configuration are connected to the structure for transfer of a force and/or moment onto the shaft.

Suitably, the secant-like and/or arcuate webs form a honeycomb pattern. Secant-like webs may have varying configuration. For example, the webs may resemble secants and thus extend within the rotor from one outer side to the opposite other outer side of the rotor. The secant-like webs may, however, also be shorter so that only fictional prolongations intersect the radial outer areas of the rotor. The Such secant-like partial webs and webs may be so arranged as to form a honeycomb pattern which may form a closely meshed net within the rotor for transmitting forces from the outside to the inner region of the rotor. As the forces are divided over different secant-like partial webs, the partial webs can be reduced to a single partial web as far as their size, i.e. their thickness, their cross section and/or their volume, is concerned. Forces can thus be divided in a targeted manner symmetrically or asymmetrically, without necessarily increasing the material consumption and the weight. The same principle as described in connection with secant-like webs and/or partial webs is equally applicable to arcuate webs and/or partial webs. In particular, when very small honeycomb patterns are involved, which can also be implemented by foams, the webs are curved and/or arcuate.

Secant-like partial webs can be extended to form secant-like webs. It is, however, also possible to so shorten secant-like partial webs as to realize a honeycomb pattern with very small honeycomb cells. Also arcuate webs and/or partial webs can be shortened to form a honeycomb. The honeycomb is established by neighboring confined cells (units). The three-dimensional design of secant-like webs and/or partial webs can be made in the third dimension in various spatial directions. The three-dimensional configuration allows formation of planes and/or areas of large and/or small designs. When these areas and/or planes intersect at slight distances, the honeycomb pattern is transformed into very small shapes. These shapes can be realized by foams which have honeycomb patters of relatively small cells. The great number of voids reduces the weight, decreases the inertia and improves the dynamics. Foams transfer forces from the torque receiving structure to the structure for force transfer between rotor and shaft.

According to another feature of the present invention, the honeycomb pattern is formed by a foam-like structure or foam. Foams can form foam-like structures, and may be made of different materials. Material examples for foams include plastics and/or metals and/or metal alloys. The foam material can be chosen in dependence on the desired properties. Foams of one or more plastics can be selected to impart rigid or flexible properties to the foam. Foams of metal and/or metal alloys lead to relatively firm structures which are still light in relationship to the occupied volume.

The force transfer between the torque receiving structure and the foam and between the foam and the structure for force transfer onto the shaft may be realized through positive engagement. Geometric configurations of the respective surface offer hereby various options. Included are geometric engagement members which transfer forces and/or torques. Foams, which increase in volume, can, for example, be used to provide non-positive connections, because the volume in which they expand is limited. To the outside, the boundary is established by the torque receiving structure, and to the inside toward the symmetry axis, the boundary is established by either the structure for force transfer or by the shaft itself, when the foam itself forms the structure for force transfer. It is to be understood by persons skilled in the art that the term "foam" is used here in a generic sense and includes a structure with small honeycomb cells as well as an autonomous structure.

According to another feature of the present invention, the honeycomb may be rigid. A rigid honeycomb as well as rigid webs and/or partial webs provide a rigid force transfer between the torque receiving structure and the structure for force transfer upon the shaft. This is true also for solid foams. Rigid constructions allow a simplified mechanical description of the system and do not or only insignificantly influence a possible oscillation behavior of the system.

The honeycomb may also be of flexible design. Flexible secant-like and/or arcuate webs and/or secant-like and/or arcuate partial webs as well as flexible foams form a spring element and/or damper within the system of the electric machine. Damping properties or spring properties can thus be best suited to the needs of the electric machine at hand. Damping behavior allows, for example, attenuating oscillations, which have been introduced into the electric machine from outside by a load. Flexible and/or soft constructions fulfill the function of a torsional vibration damper. Through material selection and or shaping, it is possible to provide flexibility of the honeycomb construction. Material examples include sheet metal, metals or plastics. Webs and/or partial webs may have a profile and/or cross section to provide elastic properties depending on the material selected. Furthermore, intersections or intersecting planes of webs can be so configured as to act like a hinge. Comparable are hereby film hinges in plastics.

According to another feature of the present invention, the rotor may be made of multipart construction. This is advantageous because the structure for transfer of forces from the outer side of the rotor to the inner side of the rotor can be fabricated separately. The outer flux guide ring may have split configuration so as to incorporate the structure for force transfer between outer rotor side and inner rotor side in one half or in a smaller unit, and subsequently to so cover the structure with the secant-like webs by a second or end portion of the outer ring as to implement an operative rotor. The multipart construction of the rotor is advantageous when the rotor has a great diameter, as fabrication is facilitated and costs are reduced.

According to another feature of the present invention, the rotor may be made of at least two materials. When constructing the rotor of roughly three functional units, with a first unit guiding the magnetic flux and carrying the excitation structure, with a second unit directing the torque from the excitation structure or the return yoke components to the shaft, and with a third unit establishing the connection to the shaft, the units can be made of different materials. In a construction with one material, the rotor may have stacked and punched laminations having an outer surface area for attachment of, e.g., magnets. In a construction with several materials, one structure made through injection molding is used to ensure a coupling of the flux guide ring to the shaft. This structure may be made, for example, of plastic and has honeycomb cells.

In the event the number of cells within the rotor is small so that cells are in side-by-side relationship only in rotation direction, or there are only few layers of superimposed honeycomb cells, the punching operation, for example, in rotor laminations is still simple and cost-efficient. When the number of cells increases to thereby reduce the size of the cells, materials should be selected that allows such a fine construction in a cost-efficient manner. Examples include plastics which form fine textures as injection molded parts. In case of even smaller honeycomb cells, foams can be used and may be made of different materials or different chemicals.

BRIEF DESCRIPTION OF THE DRAWING

Other features and advantages of the present invention will be more readily apparent upon reading the following description of preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals.

Figure 1:
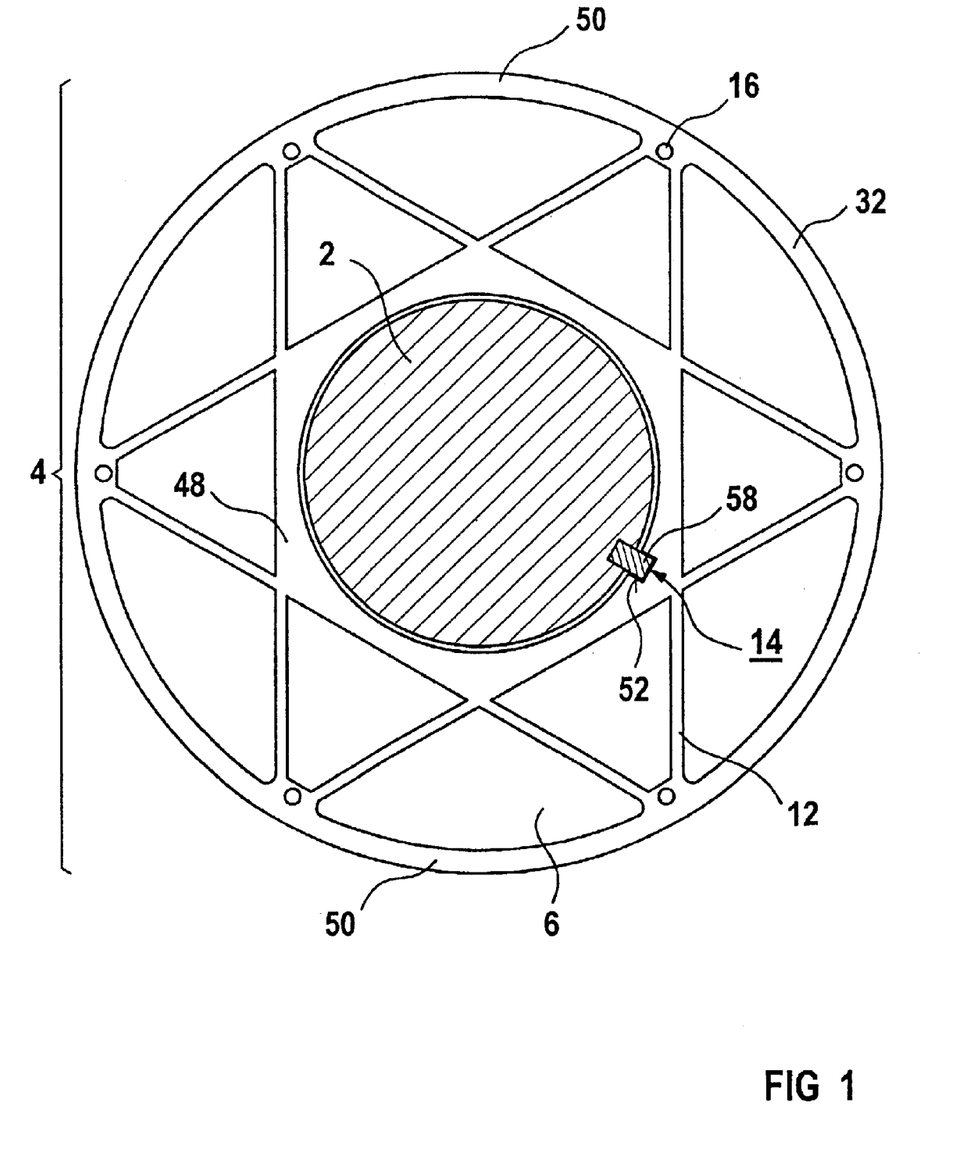
FIG. 1 is a partially cross sectional view of one embodiment of an electric machine according to the present invention, illustrating in detail a rotor and a shaft of the electric machine.

Turning now to the drawing, and in particular to FIG. 1, there is shown a partially cross sectional view of one embodiment of an electric machine according to the present invention, including a rotor, designated in its entirety by reference numeral 4, and a shaft 2. The rotor 4 has a circular outer area to form an outer annulus which constitutes a torque receiving structure 32 upon the rotor 4, with the torque being generated through an excitation structure. Although not shown in FIG. 1, the excitation structure may be located on the rotor 4 to thereby effectively form part of the rotor. Examples of an excitation structure include permanent magnets or electric conductors which, e.g., may form a cage in the case of asynchronous machine, or conduct an applied current in the case of synchronous machines. At operation of the electric machine, a torque or force is applied onto the excitation structure and transmitted to the rotor 4 because the excitation structure forms part of the rotor 4.

As afore-described, the torque receiving structure 32 on the rotor 4 is constituted by the outer annulus which defines also the zone for conduction of the magnetic flux and is also designated in FIG. 1 as flux guide ring 50. In view of the correlation between the flux formation and the torque formation, there is also a relationship of kinetic nature between the flux guide ring 50 and the torque receiving structure 32.

The rotor 4 is composed of a stack of several rotor laminations (only one is visible in FIG. 1). Each rotor lamination is provided with retention holes 16 in spaced-apart relationship about the inner radius of the flux guide ring 50. Suitably, the retention holes 16 are spaced symmetrically to absorb also symmetrically encountered forces. The retention holes 16 of stacked rotor laminations are aligned for passage of, e.g., holding bars (not shown) to thereby connect the rotor laminations together.

When a torque is generated by the excitation structure and received by the torque receiving structure 32 of the rotor 4, this torque has to be transmitted to the shaft 2, which means that forces have to be directed to the interior region of the rotor 4. The transfer of torque is realized by a web structure which is configured to provide an inertial mass relief and includes secant-like webs 12. In the non-limiting example of FIG. 1, the web structure of the rotor 4 has six secants configured to form a six-pointed star defined by two intersecting equilateral triangles. The secant-like webs 12 respectively extend between facing retention holes 16 and are connected in the area of the retention holes 16 with the flux guide ring 50. Interiorly of the rotor 4, the web structure forms a polygon configured as polygonal ring 48 which has a central circular bore for receiving the shaft 2. Torque generated by the excitation structure and picked up by the torque receiving structure 32 is transmitted onto the secant-like webs 12 and from there into the rotor interior to the polygonal ring 48. A transfer of the force or torque to the shaft 2 is realized via a fitting key assembly, generally designated by reference numeral 14 and interconnecting the polygonal ring 48 with the shaft 2. The fitting key assembly 14 is implemented by providing the polygonal ring 48 and the shaft 2 with aligned grooves 52 for insertion of a complementary key 58. Of course, the configuration of the force transfer structure between the polygonal ring 48 and the shaft 2 in the form of a fitting key assembly is described by example only, and other configurations or mechanisms for transfer of forces or torque which generally follow the concept outlined here are considered to be covered by this disclosure. Examples include material-based joints, such as gluing or welding, or positive or form-fitting connections like fitting keys but of different geometric shape, such as polygons, or non-positive or force-fitting connections, such as shrinkage of the rotor 4 onto the shaft 2.

The use of secant-like webs 12 defines an inertial mass relief structure through formation of a plurality of apertures or relief zones 6 provided between the secant-like webs 12, the polygonal ring 48 and the flux guide ring 50. The arrangement of relief zones 6 reduces the material consumption for producing the rotor 4 and thus lowers the overall weight thereof. A weight reduction lowers the moment of inertia as a result of a decrease in mass, so that the electric machine, which has incorporated therein the rotor 4, gains dynamics. The lower moment of inertia is derived however not solely by the general weight reduction but also in particular by the location and position of those areas of the rotor 4 where the weight reduction is realized. In the example of FIG. 1, the rotor 4 constitutes the rotating system. As especially the outer sides of the rotor 4 have relief zones through provision of outer secant-like webs 12, a substantial reduction of the moment of inertia of the entire rotor 4 is obtained.

In the example of FIG. 1, the rotor 4 is composed roughly of three functional units. A first functional unit includes the flux guide ring 50, which conducts the magnetic flux and carries the magnets, not shown. A second functional unit includes the web structure 12 that transfers the torque from the torque excitation, i.e. magnets or the return yoke components, to the shaft 2. A third functional unit provides the connection to the shaft 2 and includes the polygonal ring 48 and the force transfer between the polygonal ring 48 and the shaft 2, as exemplified by the fitting key assembly 14. This rough breakdown of the rotor 4 allows also to optically distinguish the three functional units. This represents another feature of the novel and inventive rotor according to the present invention.

Figure 2:
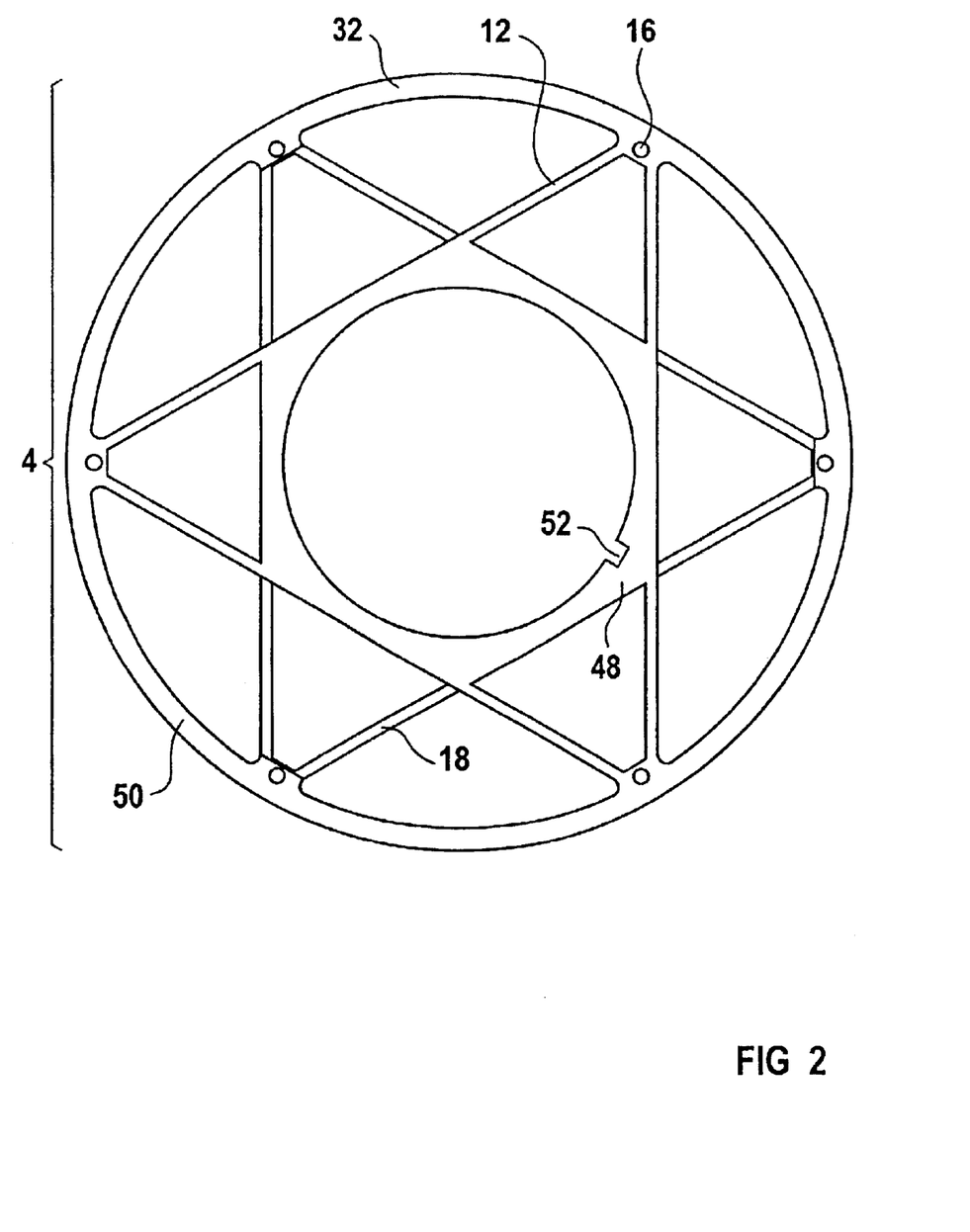
FIG. 2 is a detailed illustration of a rotor lamination of use in a variation of a rotor of an electric machine according to the present invention.

Turning now to FIG. 2, there is shown a detailed illustration of a variation of a rotor 4 of an electric machine according to the present invention. Parts corresponding with those in FIG. 1 are denoted by identical reference numerals and not explained again. In this embodiment, provision is made for a different web structure for force transfer and for providing the inertial mass relief of a rotor lamination. The web structure for each rotor lamination includes only three secant-like webs 12 for connecting the flux guide ring 50 with the polygonal ring 48 in the interior of the rotor 4. A force transfer is realized between the various rotor laminations by a forced engagement via connectors in the retention holes 16. A forced engagement between the rotor laminations can also be realized, for example, through welded joints or clamps.

In the embodiment of FIG. 2, the webs 12 of each rotor lamination resemble a spoke configuration. In order to ensure a strength (ruggedness) and force transfer that are similar to the rotor 4 of FIG. 1, the rotor laminations are respectively positioned in 120° rotation so that the stack of rotor laminations is so arranged that a rotor lamination with secant-like webs 12 is followed by a rotor lamination with 120° rotated position of the secant-like webs 12. The rotation is illustrated in FIG. 2 by the depicted secant-like webs 18. The polygonal ring 48 is again provided with a groove 52 as part of a fitting key assembly for conjoint movement of the rotor 4 and the shaft (not shown in FIG. 2). The outer narrow annulus of the rotor 4 forms the flux guide ring 50 to allow a magnetic return flow. Of course, symmetries differing from 120° are also possible, although not shown.

Figure 3:
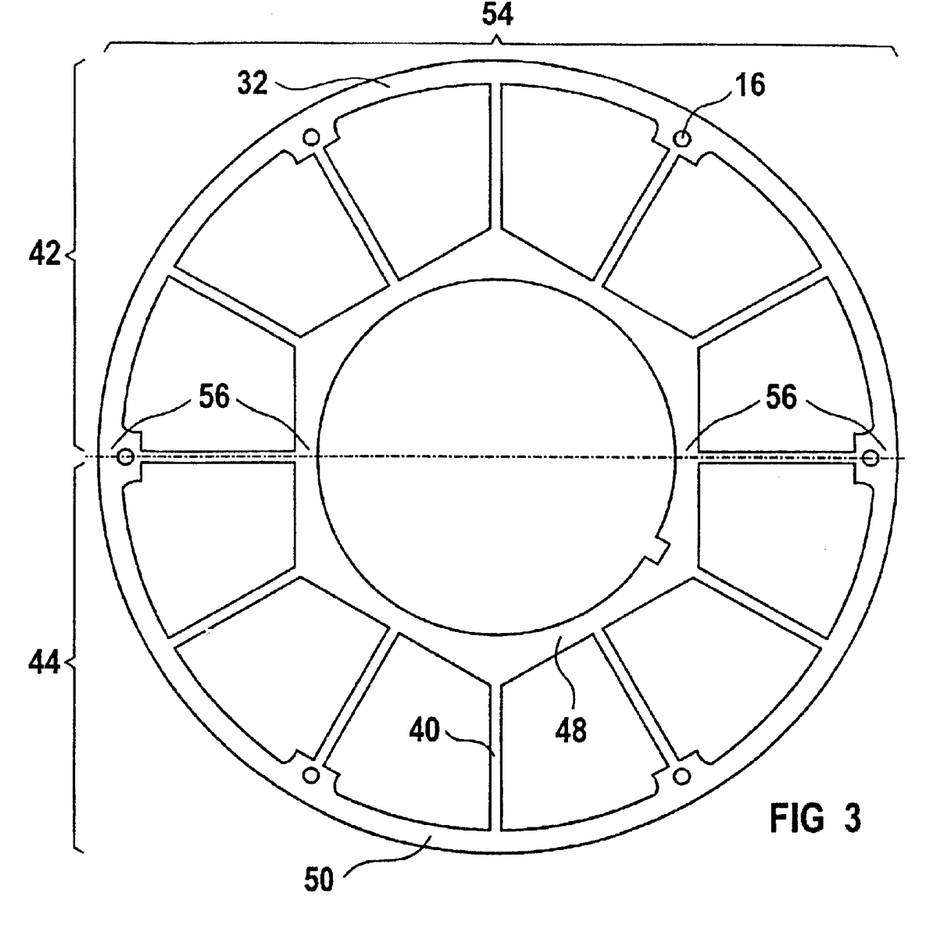
FIG. 3 is a detailed illustration of another variation of a rotor lamination.

FIG. 3 shows a detailed illustration of another variation of a rotor lamination, generally designated by reference numeral 54. The rotor lamination 54 has a two-part configuration with a top piece 42 and a bottom piece 44. In this context, it is noted that the reference to "top" and "bottom" should be viewed in connection with the depiction of FIG. 3. The provision of a multipart construction is suitable especially when the rotor has great radii to thereby improve its handling. Persons skilled in the art will understand that the two-part configuration is only an exemplified embodiment as the rotor lamination 54 may, of course, be composed of more than two parts.

The top piece 42 and the bottom piece 44 are separated along a partition line 56. Connection of the top and bottom pieces 42, 44 is thus is effected at the partition line 56 to form the rotor. In the embodiment of FIG. 3, the web structure includes secant-like partial webs 40 which do not extend across the rotor like the webs 12 and thus represent an even smaller part of a secant. Depending on the number of partial webs 40, it is hereby possible that secant-like partial webs 40 define a secant direction which is offset at an angle of 180° and masks or covers other secant-like partial webs 40.

Figure 4:
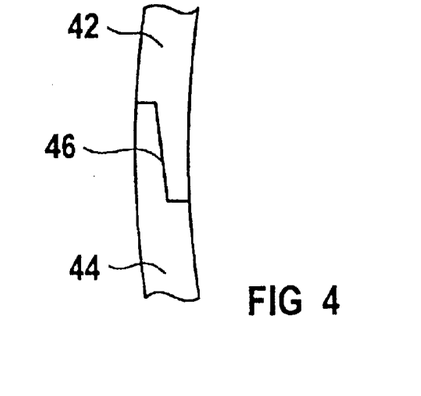
FIG. 4 is a schematic illustration of a joint of the rotor lamination.

FIG. 4 shows a possible type of connection between the top piece 42 and the bottom piece 44 of the rotor lamination 54. This type of connection is a fitting joint 46 which has geometric shapes. In the example of FIG. 4, the joint 46 is formed by projecting fingers at confronting ends of the top and bottom pieces 42, 44 for interlocking engagement. This type of joint has a high fitting accuracy.

Figure 5:
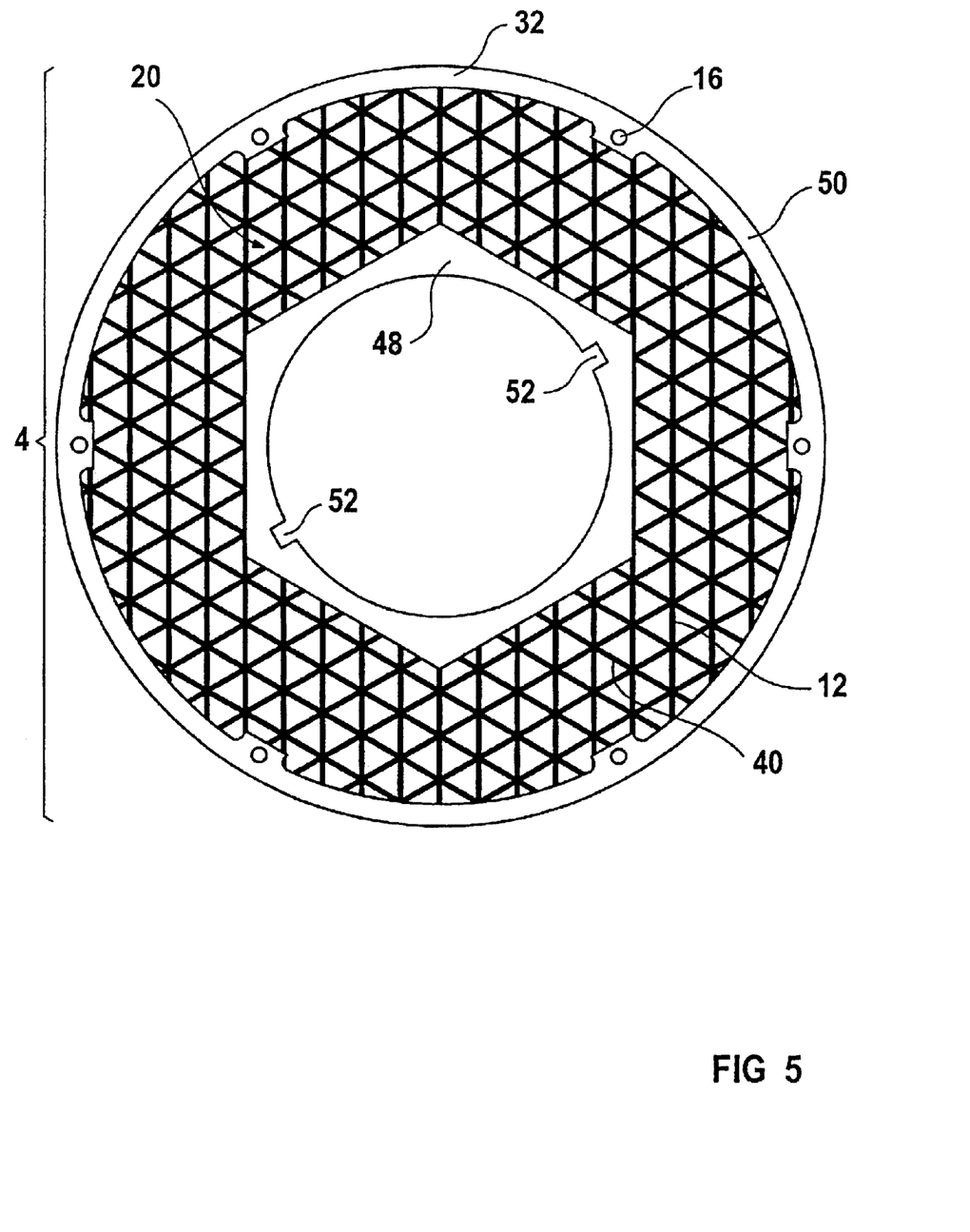
FIG. 5 is a detailed illustration of another embodiment of an electric machine according to the present invention, illustrating a variation of a rotor.

Turning now to FIG. 5, there is shown a detailed illustration of another variation of a rotor 4 of an electric machine. Again, parts corresponding with those in FIG. 1 are denoted by identical reference numerals and not explained again. In this embodiment, the web structure forms a honeycomb pattern, designated by reference numeral 20, and is composed of secant-like webs 12 and secant-like partial webs 40. The difference between the secant-like webs 12 and secant-like partial webs 40 resides in the fact that the webs 12 intersect the flux guide ring 50 at two points and thus extend continuously, whereas the partial webs 40 follow only partially a secant and are breached in the interior of the rotor by the polygonal ring 48. The force transfer from the polygonal ring 48 to the shaft, not shown, is implemented by a fitting key assembly in a manner as shown in FIG. 1 via formed grooves 52. The great number of webs 12 and partial webs 40, compared to the embodiment of FIG. 1, enhances the strength of the rotor 4 and effects an more even force transfer onto the webs 12 and partial webs 40 and from there onto the polygonal ring 48. As a consequence, the material thickness of the flux guide ring 50 and/or of the polygonal ring 48 can be decreased. This in turn reduces the moment of inertia. When the webs 12 and the partial webs 40 have a thickness which corresponds to a thickness of the webs 12 in the embodiment of the rotor of FIG. 1, the weight and thus the moment of inertia will be increased. When the webs 12 and the partial webs 40 have a thickness which is reduced compared to the thickness of the webs 12 in the embodiment of the rotor of FIG. 1, then a balance has to be struck between material consumption and reduction in thickness of the various webs.

The stiffness of the rotor 4 can be influenced through configuration of the webs 12 and partial webs 40 and through material selection for making the webs. A coarse honeycomb, as shown in FIGS. 1 and 2 with flexible configuration of the webs 12 results in a rotor 4 that can be utilized as damper or spring between motor and the motor-driven load. The flexibility of the honeycomb may also be implemented through flexible configuration of the joints between the webs 12.

Figure 6:
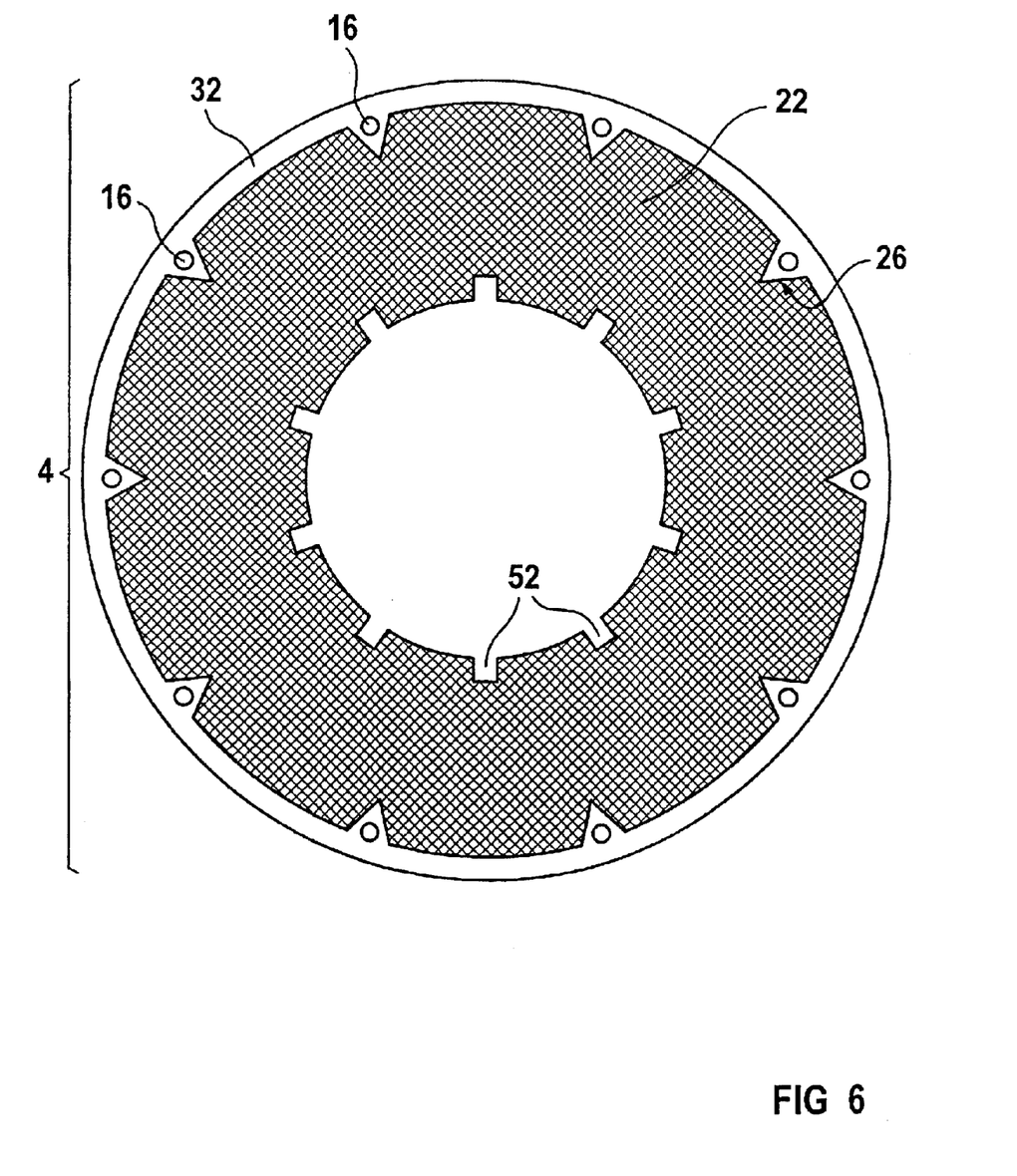
FIG. 6 is a detailed illustration of still another embodiment of an electric machine according to the present invention, illustrating another variation of a rotor.

FIG. 6 shows another variation of a rotor lamination for a rotor 4 in which the web structure is configured as honeycomb-like foam structure 22. A difference to the embodiment of FIG. 5 is the configuration of the honeycomb cells which in FIG. 6 have been greatly reduced in size and are closed. In particular foams are cost-efficient materials and their properties can be suited to the situation at hand. In this way, solid or firm foam with slight or no springiness or damping properties can be made depending on the application. Soft, flexible foam has great springiness or damping properties. The force transfer from the torque receiving structure 32 on the rotor 4 to the foam 22 may be implemented via positive engagement, indicated by reference numeral 26, and configured in the outer region in the form of wedges. The force transfer from the foam 22 to the shaft, not shown, may be realized via fitting key assemblies, as described in connection with FIG. 1, i.e. keys fitted in grooves 52.

Figure 7:
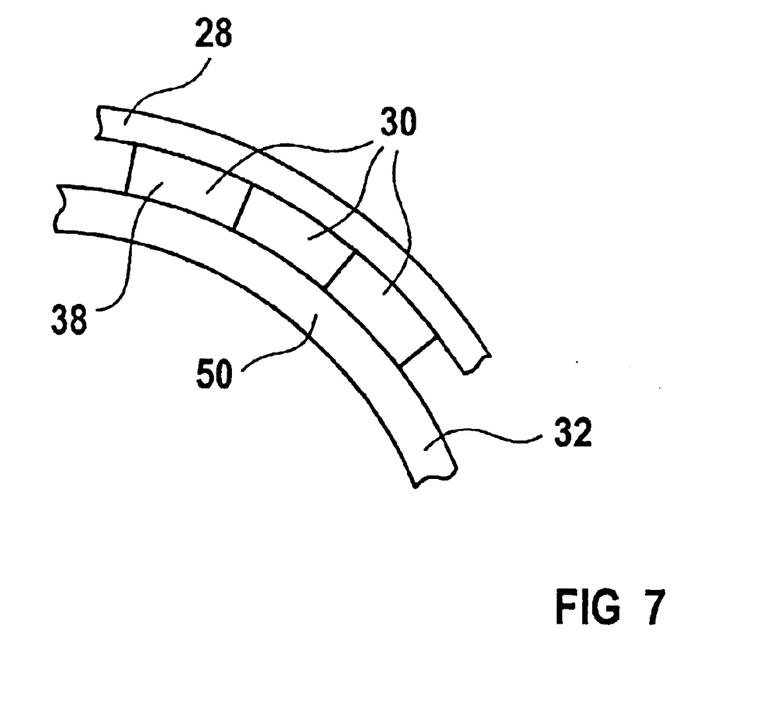
FIG. 7 is an enlarged detailed view of an outer area of the rotor of an electric permanently excited machine.

Referring now to FIG. 7, there is shown an enlarged detailed view of an outer area of the rotor of an electric permanently excited machine. Positioned upon the flux guide ring 50 are permanent magnets 38, which form part of the excitation structure 32 for generating a torque. The permanent magnets 38 are connected to the flux guide ring 50 via a bandage 28, which is able to absorb centrifugal forces of the permanent magnets 38 during rotating movement.

Figure 8:
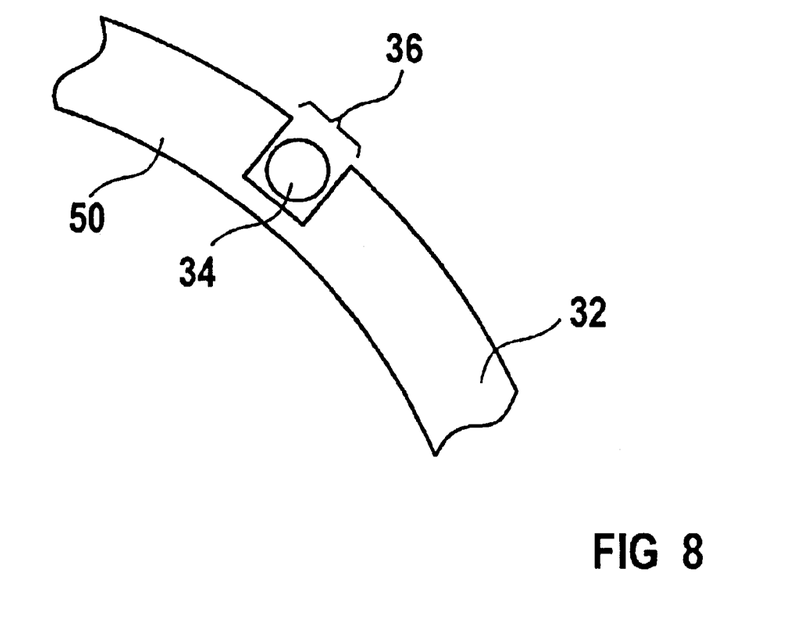
FIG. 8 is an enlarged detailed view of a portion of the rotor of an electric machine with electric conductors for excitation of the rotor.

FIG. 8 shows an enlarged detailed view of a portion of the rotor of an electric machine, with the flux guide ring 50 being formed with a slot 36 for receiving at least one winding 34. Torque and forces acting on the winding 34 are transferred via the slot 36 onto the torque receiving structure 32 of the rotor. In asynchronous machines as well as in separately excited synchronous machines does the rotor have windings.

While the invention has been illustrated and described as embodied in an electric machine with rotor of low inertia, it is not intended to be limited to the details shown since various modifications and structural changes may be made without departing in any way from the spirit of the present invention.

What is claimed as new and desired to be protected by Letters Patent is set forth in the appended claims:

What is claimed is:

1. An electric machine, comprising:
   a shaft;
   a rotor having a laminated configuration;
   means for excitation of at least portions of the rotor;
   means for torque pickup upon the rotor;
   means for force transfer between the rotor and the shaft; and
   a web structure between the means for torque pickup and the means for force transfer while effecting an inertial mass relief of the rotor.

2. The electric machine of claim 1, wherein the web structure has at least one web configured as secant.

3. The electric machine of claim 1, wherein the web structure has at least one web configured as arc.

4. The electric machine of claim 1, wherein the means for excitation includes at least one winding of an electric conductor.

5. The electric machine of claim 1, wherein the means for torque pickup includes at least one slot for receiving at least one winding.

6. The electric machine of claim 1 in the form of a permanently excited synchronous machine.

7. The electric machine of claim 6, wherein the means for excitation includes at least one permanent magnet.

8. The electric machine of claim 7, wherein the means for torque pickup contacts at least partially the at least one permanent magnet.

9. The electric machine of claim 1, wherein the means for force transfer between the rotor and the shaft includes at least one connection selected from the group consisting of positive engagement, non-positive engagement, and material-based joint.

10. The electric machine of claim 1, wherein the web structure is configured to have a honeycomb pattern.

11. The electric machine of claim 10, wherein the honeycomb pattern of the web structure is formed by a foam.

12. The electric machine of claim 10, wherein the honeycomb pattern of the web structure is made rigid.

13. The electric machine of claim 10, wherein the honeycomb pattern of the web structure is made flexible.

14. The electric machine of claim 1, wherein the rotor is assembled from several parts.

15. The electric machine of claim 1, wherein the rotor is made of at least two materials.

16. An electric machine, comprising:
    a rotor having a laminated configuration;
    a shaft centered interiorly of the rotor;
    an excitation structure for generating a torque;
    a torque receiving structure for picking up the torque from the excitation structure and imparting the torque onto the rotor; and
    a connection structure for providing a fixed rotative engagement between the rotor and the shaft;
    wherein the rotor includes a web structure extending inwardly from the torque receiving structure to the shaft and effecting an inertial mass relief of the rotor.

17. The electric machine of claim 16, wherein the web structure has at least one web configured as secant.

18. The electric machine of claim 16, wherein the web structure has at least one web configured as arc.

19. The electric machine of claim 16, wherein the excitation structure includes at least one winding of an electric conductor.

20. The electric machine of claim 16, wherein the torque receiving structure includes at least one slot for receiving at least one winding.

21. The electric machine of claim 16, wherein the excitation structure includes at least one permanent magnet disposed in a slot of the torque receiving structure contacts at least partially the at least one permanent magnet.

22. The electric machine of claim 16, wherein the connection structure includes at least one connection selected from the group consisting of positive engagement, non-positive engagement, and material-based joint.

23. The electric machine of claim 16, wherein the web structure is configured to have a honeycomb pattern.

24. The electric machine of claim 23, wherein the honeycomb pattern of the web structure is formed by a foam.

25. The electric machine of claim 23, wherein the honeycomb pattern of the web structure is made rigid.

26. The electric machine of claim 23, wherein the honeycomb pattern of the web structure is made flexible.

27. The electric machine of claim 16, wherein the rotor is assembled from several parts.

28. The electric machine of claim 16, wherein the rotor is made of at least two materials.

29. The electric machine of claim 16, wherein the web structure includes a polygonal ring embracing the shaft and a plurality of webs extending between the torque receiving structure and the polygonal ring.

30. The electric machine of claim 22, wherein the positive engagement includes a fitting key assembly, including a key received in aligned grooves of the web structure and the shaft.

31. The electric machine of claim 22, wherein the non-positive engagement includes shrinking of the rotor onto the shaft.

32. The electric machine of claim 22, wherein the material-based joint includes a process selected from the group consisting of gluing and welding for connecting the rotor to the shaft.

33. A rotor adapted for use in an electric machine, comprising:
   a body portion having a laminated core structure and including an outer annulus and a web structure configured to effect an inertial mass relief of the main body, wherein the web structure extends inwardly from the annulus and forms a bore for receiving a shaft; and
   an excitation structure operatively connected to the annulus for imparting a torque on the body portion.

34. The rotor of claim 33, wherein the web structure includes a plurality of webs so crisscrossing the body portion as to define a plurality of relief zones.

35. The rotor of claim 34, wherein the webs are arcuate.

36. The rotor of claim 33, wherein the excitation structure includes an element connected to the annulus and selected from the group consisting of permanent magnet and an electric conductor.

37. The rotor of claim 34, wherein the webs exhibit a honeycomb pattern.

38. The rotor of claim 37, wherein the honeycomb pattern of the web structure is formed by a foam.

* * * * *